(12) United States Patent
Riano

(10) Patent No.: US 6,174,510 B1
(45) Date of Patent: Jan. 16, 2001

(54) MULTI-PASS COCURRENT FLOW SULFURIC ACID TOWER PROCESS

(76) Inventor: Marcos D. Riano, P.O. Box 24, Lake City, FL (US) 32056

(*) Notice: Under 35 U.S.C. 154(b), the term of this patent shall be extended for 0 days.

(21) Appl. No.: 09/383,427

(22) Filed: Aug. 27, 1999

(51) Int. Cl.$^7$ .................................................. C01B 17/69
(52) U.S. Cl. .......................... 423/522; 422/161; 95/137; 95/235; 55/233
(58) Field of Search .................................... 422/160, 161; 95/137, 235, 211; 423/522; 55/233

(56) References Cited

U.S. PATENT DOCUMENTS

| | | | |
|---|---|---|---|
| 1,013,638 | * | 1/1912 | Briggs et al. .......................... 423/522 |
| 2,071,598 | * | 2/1937 | Von Girsewald ...................... 423/522 |
| 3,432,264 | * | 3/1969 | Bostwick et al. ..................... 423/522 |
| 3,454,360 | * | 7/1969 | Detweilor ............................. 423/522 |
| 3,944,401 | * | 3/1976 | Dorr et al. ............................ 423/522 |
| 4,368,183 | * | 1/1983 | Dorr et al. ............................ 423/522 |
| 4,654,205 | * | 3/1987 | Cameron ............................... 423/522 |
| 4,957,512 | * | 9/1990 | Dewison et al. ...................... 55/122 |
| 5,032,373 | * | 7/1991 | Jones et al. ........................... 423/522 |
| 5,389,354 | * | 2/1995 | Brändle et al. ....................... 423/522 |
| 5,683,670 | * | 11/1997 | Pewg .................................... 423/522 |

* cited by examiner

*Primary Examiner*—Gary P. Straub
(74) *Attorney, Agent, or Firm*—Edgar W. Averill, Jr.

(57) ABSTRACT

A process for the absorbing of a hot, dry gas stream of sulfur trioxide ($SO_3$) in a stream of strong sulfuric acid. The process includes the steps of passing the hot, dry gas stream of $SO_3$ into a sulfuric acid absorption tower above a packed bed held within the tower and below a liquid collection floor. A stream of strong sulfuric acid is introduced into the tower above the packed bed and allowed to pass cocurrently downwardly through the packed bed with the stream of $SO_3$, thereby allowing the $SO_3$ to be absorbed in the stream of strong sulfuric acid. The resulting concentrated sulfuric acid passes through a packing support into a lower plenum and the spent gas is fed upwardly through a gas conduit to an upper plenum located above the liquid collection floor and from there through a mist eliminator.

3 Claims, 1 Drawing Sheet

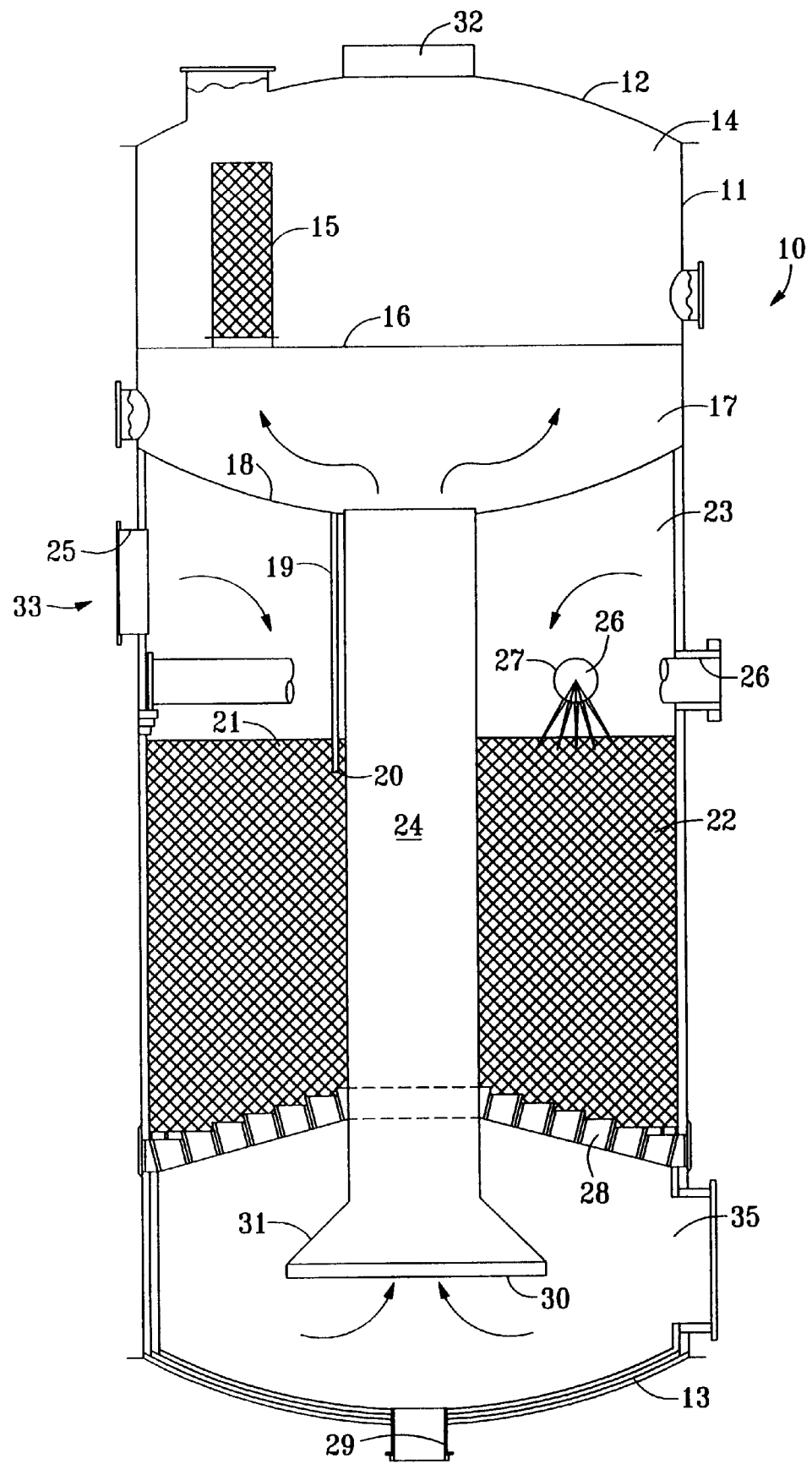

MULTI-PASS COCURRENT FLOW SULFURIC ACID TOWER PROCESS

BACKGROUND OF THE INVENTION

The field of the invention is sulfuric acid production processes and the invention relates more particularly to $SO_3$ absorption towers, either inter-absorption towers or final absorption towers.

The classic concept of an $SO_3$ absorption tower is shown in U.S. Pat. No. 1,013,638. A stream of sulfuric acid having a strength from 97% to 99.5% is fed onto an upper surface of a packing of quartz and drips downwardly through the packing. A stream of $SO_3$ is caused to enter the base of the tower below the packing and move counter currently upwardly through the packing, thereby being absorbed by the sulfuric acid moving downwardly. This same process with many improvements continues today. In the Von Girsewald, et al. U.S. Pat. No. 2,071,598, concentrated sulfuric acid and $SO_3$ are introduced into the top of a series of tubes and trickle downwardly as a counter current flow of a coolant is moved upwardly along the exterior of the tubes.

In the Detweiler U.S. Pat. No. 3,454,360 shows a basic single absorption sulfuric acid plant where acid is introduced into the top of an absorber and $SO_3$ is introduced into the bottom.

The Dorr, et al. U.S. Pat. No. 4,368,183 utilizes a venturi where it is contacted with cocurrent sulfuric acid. The acid exiting the venturi is passed into a succeeding absorption stage through a packed layer and finally into a final counter current absorption tower.

The Cameron U.S. Pat. No. 4,654,205 shows an $SO_3$ absorption process where acid is introduced into a mid-point of a packed bed and $SO_3$ gas is passed upwardly from the bottom of the bed in a counter current manner.

The Peng U.S. Pat. No. 5,683,670 shows a sulfuric acid process which includes a counter current absorption tower.

The use of sulfuric acid continues to increase with increased population. The majority of sulfuric acid is used in the production of fertilizers for agricultural uses and as more and more fertilizers are required, more and more sulfuric acid is needed. The majority of sulfuric acid plants built today are large size plants producing between 1,000 and 2,000 tons per day. Typically, they are designed with three towers: A drying tower, an inter-absorption tower and a final absorption tower. The inter-absorption and final absorption towers are practically identical in construction. Both towers have heat exchangers, brink mist eliminators and candles installed in the upper section above the packing to remove essentially all acid mist particles. Typically, all three towers are packed with ceramic packing about 13' in depth. The packing beds are supported by ceramic bars resting on acid-proof brick piers. All sulfuric acid contact method processes start at the drying tower. Single absorption plants have only two towers, a drying tower and an absorption tower, and double contact double absorption plants have three towers, a drying tower, an inter-absorption tower and a final absorption tower. The drying tower has an input stream of air which is contacted with strong 98.5% sulfuric acid which is highly hygroscopic and removes essentially all moisture from the air. The moisture from the air tends to lower the strength of the circulating acid and to raise the acid level in the tower. Both tendencies are controlled by transferring acid to and from the drying tower so that the required acid strength as well as the required acid level are maintained as is the temperature. In the double contact double absorption process the first absorbing tower is an interpass tower which absorbs $SO_3$ produced in a converter. The $SO_3$ is absorbed in strong sulfuric acid (98.5%) to produce more sulfuric acid. In the absorption tower, the small amount of water (1.5%) present in the circulating acid causes the $SO_3$ to react and become $H_2SO_4$. $SO_2$ is not absorbed in the circulating acid and is vented to the atmosphere in the case of a single absorption plant. In the case of a double absorption/double contact plant, the $SO_2$ is returned to the converter after the first absorption tower to be converted to $SO_3$ before the last pass which is performed through the final absorption tower. In this manner, most of the residual $SO_2$ which wasn't oxidized to $SO_3$ in the converter prior to the first absorption tower is now converted to $SO_3$. The second and final charge of $SO_3$ is then absorbed in the final absorption tower. The remaining gas, which is essentially $SO_3$ free, is vented to the atmosphere. This vented gas still contains small amounts of $SO_2$ which was not converted to $SO_3$ in the converter and possible traces of $SO_3$ which escape unconverted from the final acid tower. Environmental regulations are very strict and limit the amount of $SO_2$ per ton of production that can be released to the atmosphere. This legal limitation obliges the producers to spend money for additional scrubbers or, alternatively, to try to improve the operation of the tower by using different packing materials, venturi scrubbers and the like, to comply with the law.

The problem of cleaning the exit gas is a serious one and is compounded by the increased demand for sulfuric acid. Most sulfuric acid plant production can be increased by 100–200 tons per day above the plant's original design capacity. Attempts to further increase production cause the conventional tower to be flooded which is unacceptable.

Inter-absorption and final absorption towers have a significant back pressure which is mainly caused by the counter current flow of the downwardly moving acid and the upwardly moving gas. This counter current flow also creates a significant amount of mist since the upwardly moving gas can carry the mist upwardly out of the packed bed. This creates the expensive use of large mist eliminators and the back pressure also consumes a great deal of energy. There is, thus, a need for a sulfuric acid process which reduces the amount of mist produced, and which reduces back pressure.

BRIEF SUMMARY OF THE INVENTION

It is an object of the present invention to provide a process for absorbing $SO_3$ in strong sulfuric acid which has reduced back pressure and reduced mist production.

The present invention is for a process for the absorbing of a hot, dry gas stream of sulfur trioxide ($SO_3$) in a stream of strong sulfuric acid. The process includes the steps of passing the hot, dry gas stream of $SO_3$ into a sulfuric tower above a packed bed held within the tower and below a liquid collection floor. Next, a stream of strong sulfuric acid is introduced into the tower above the packed bed and passes cocurrently down through the packed bed with the hot, dry gas stream of $SO_3$. The packed bed is supported on a packing support which is positioned above a lower plenum. The concentrated sulfuric acid flows to the bottom of the tower where it is removed and the resulting spent gas stream is passed upwardly through a gas conduit to an upper plenum located above the liquid collection floor. From the upper plenum the spent gas passes through a mist eliminator to remove any remaining mist and to pass a dry gas out of the top of the reactor. Preferably, the conduit through which the spent gas passes is positioned in the center of the packed bed, permitting the gas stream to move upwardly through a center tube. Preferably, the bottom end of the center tube is flared outwardly to deflect concentrated acid passing through the vacuum support.

BRIEF DESCRIPTION OF THE DRAWINGS

The drawing is a cross-sectional view of the absorption tower used in the process of the present invention.

DESCRIPTION OF THE PREFERRED EMBODIMENTS

An absorption tower is shown in the drawings and indicated by reference character 10. Tower 10 has a cylindrical side wall 11, a top 12, and a bottom 13. Within absorption tower 10 is a mist eliminator 14. Mist elimination means, such as candle mist eliminator 15, is supported on tube sheet 16 at the bottom of the mist eliminator section 14. An upper plenum 17 is located between tube sheet 16 and liquid collection floor 18. Any liquid settling out of the upward moving gas stream and collected by the mist eliminators falls onto liquid collection floor 18 and passes downwardly through drain tube 19 which exits at 20 below an upper surface 21 of packed bed 22. A gas and liquid introduction plenum 23 is located between liquid collection floor 18 and upper surface 21 of packed bed 22. Gas and liquid introduction plenum 23 surrounds a center tube 24 which provides a gas conduit described below.

Hot, dry $SO_3$ gas is introduced through gas introduction nozzle 25 into gas and liquid introduction plenum 23. Strong (98.5%) sulfuric acid is introduced through acid introduction nozzle 26. Acid which is introduced into acid introduction nozzle 26 is distributed over the upper surface 21 of packed bed 22 through a nozzle such as that indicated by reference character 27. The gas and acid drip downwardly through packed bed 22 which is preferably about 14' in depth and comprises saddles or other appropriate packing. The gas, after being exposed to the acid bath, moves out of the bottom of packed bed 22 through packing support 28. The resulting concentrated acid also drips out through packing support 28 and falls onto the bottom 13 of tower 10. It is then removed through concentrated acid exit nozzle 29.

The gas, after being exposed to the acid bath in packed bed 22, travels up center tube 24. Center tube 24 has a lower end 30 which includes an outwardly flared portion 31. This outwardly flared portion directs the acid outwardly from lower end 30. The lower end 30 is large enough so that the gas velocity is substantially reduced, thereby causing a maximum amount of liquid to fall downwardly rather than being entrained in the upwardly flowing stream of spent gas.

As the spent gas travels up the center tube, it passes into upper plenum 17 where the velocity is further reduced so that essentially all of the liquid falls downwardly onto liquid collection floor 18 and back into packed bed 22 through drain tube 19. Because the acid and gas flow concurrently down through packed bed 22, the amount of liquid which is entrained in the gas stream is greatly reduced compared to the conventional counter current flow pattern. The essentially dry, spent gas is also passed through mist eliminator means such as candle mist eliminator 15 and exits from the top 12 of the reactor through dry gas exit nozzle 32.

A typical tower of the present invention is approximately 53' in height and 21' in diameter. The center tube is preferably about 5' in diameter.

The downward flows of acid and gas eliminate, or at least significantly minimize, acid mist production. Acid mist production can be substantial in the conventional counter current tower where the upward gas flow can reach approximately 13,000cfm. Furthermore, as one attempts to increase the acid production, the packed bed can be flooded, thereby preventing the absorption process from being carried on.

Thus, the steps of the present invention include passing a hot, dry gas stream of $SO_3$ into tower 10 above packed bed 22. A stream of strong sulfuric acid is also introduced above packed bed 22 and the gas and acid pass cocurrently down through the packed bed, thereby allowing the $SO_3$ to be absorbed in the sulfuric acid stream. Concentrated sulfuric acid is removed from the bottom of the tower and the spent gas stream passes upwardly through center tube 24 into upper plenum 17. From there it passes through mist eliminator 15 and out of the dry gas exit nozzle 32. While center tube 24 is shown centrally located, it would also be within the purview of the present invention that one or more exterior tubes could be connected between lower plenum 35 to upper plenum 17. The important feature of the process of the present invention is the upward passing of spent gas not through a packed bed, but instead, through one or more open tubes.

The result of the use of the tower of the present invention substantially decreases energy costs by reducing back pressure and more importantly, substantially decreases the amount of entrained acid moving upwardly and potentially causing a source of pollution. The mist elimination means can be greatly reduced as compared to that required for the conventional counter current flow. Furthermore, the cocurrent passage of acid and gas eliminates the danger of flooding.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A process for the absorbing of a hot, dry gas stream of sulfur trioxide ($SO_3$) in a stream of strong sulfuric acid, said process comprising:

passing said hot, dry gas stream of $SO_3$ into a sulfuric acid tower above a packed bed held within said tower and below a liquid collection floor;

introducing said stream of strong sulfuric acid into said sulfuric acid tower above said packed bed and allowing said $SO_3$ and strong sulfuric acid to pass co-currently down through said packed bed thereby allowing said $SO_3$ to be absorbed in said stream of strong sulfuric acid as it also passes downwardly through said packed bed thereby producing a liquid stream of concentrated sulfuric acid and a spent gas stream, said packed bed being supported on a packing support located at a base of said packed bed above a lower plenum;

removing concentrated sulfuric acid from a bottom of said tower;

passing said spent gas stream upwardly through a gas conduit to an upper plenum located above said liquid collection floor through a center tube positioned centrally in said packed bed;

passing said spent gas stream upwardly through said upper plenum into a mist eliminator to remove any mist and to pass dry gas out of a top of the reactor while passing any acid collected on said liquid floor downwardly into said packed bed below the upper surface thereof.

2. The process of claim 1 wherein said center tube has an outwardly flared lower terminus to deflect acid exiting through said packing support outwardly from a lower entrance of said center tube.

3. The process of claim 1 wherein said hot, dry gas stream of $SO_3$ is introduced into said tower through a side of said tower above a position where said stream of sulfuric acid is introduced into said tower.

* * * * *